(12) United States Patent
Keisling et al.

(10) Patent No.: US 9,933,122 B2
(45) Date of Patent: Apr. 3, 2018

(54) LIGHTING DEVICE WITH CENTRAL AND PERIPHERAL ILLUMINATION

(71) Applicant: Koehler-Bright Star LLC, Hanover Township, PA (US)

(72) Inventors: Jeff Keisling, Clarks Summit, PA (US); Blair Unger, Hanover Township, PA (US)

(73) Assignee: KOEHLER-BRIGHT STAR LLC, Hanover Township, PA (US)

( * ) Notice: Subject to any disclaimer, the term of this patent is extended or adjusted under 35 U.S.C. 154(b) by 152 days.

(21) Appl. No.: 14/871,358

(22) Filed: Sep. 30, 2015

(65) Prior Publication Data

US 2016/0097498 A1    Apr. 7, 2016

Related U.S. Application Data

(60) Provisional application No. 62/057,622, filed on Sep. 30, 2014.

(51) Int. Cl.
| | |
|---|---|
| *F21L 4/00* | (2006.01) |
| *F21V 8/00* | (2006.01) |
| *F21V 5/00* | (2018.01) |
| *F21V 7/00* | (2006.01) |
| *F21Y 115/10* | (2016.01) |

(52) U.S. Cl.
CPC ............. *F21L 4/005* (2013.01); *F21V 5/006* (2013.01); *F21V 7/0075* (2013.01); *G02B 6/0005* (2013.01); *F21Y 2115/10* (2016.08)

(58) Field of Classification Search
CPC ............. F21L 4/005; F21V 5/046; F21V 7/00
See application file for complete search history.

(56) References Cited

U.S. PATENT DOCUMENTS

| | | | |
|---|---|---|---|
| 7,229,196 B2 * | 6/2007 | Hulse | F21K 9/00 362/23.01 |
| 2005/0254017 A1 * | 11/2005 | Huibers | G02B 26/008 353/84 |
| 2008/0094841 A1 * | 4/2008 | Dahm | A61C 19/003 362/294 |
| 2008/0310028 A1 * | 12/2008 | Chinniah | F21V 5/04 359/642 |
| 2014/0131327 A1 * | 5/2014 | Nishitani | B23K 26/0648 219/121.63 |
| 2014/0240967 A1 * | 8/2014 | Sharrah | F21L 4/08 362/183 |
| 2014/0268859 A1 * | 9/2014 | Kim | G02B 6/0096 362/553 |
| 2015/0219313 A1 * | 8/2015 | Marcaly | F21V 5/006 362/309 |
| 2015/0285980 A1 * | 10/2015 | Preston | G02B 6/0008 362/555 |

(Continued)

*Primary Examiner* — Jong-Suk (James) Lee
*Assistant Examiner* — Christopher E Dunay
(74) *Attorney, Agent, or Firm* — Levenfeld Peralstein, LLC

(57) ABSTRACT

A light assembly includes a light source and a reflector having a reflective interior surface and a central opening. A toroidal-shaped toroid optic includes a central bore and the light source is positioned in the central bore. The toroid optic is positioned within the central opening of the reflector. A broadening lens is attached to the reflector and positioned adjacent to the toroid optic. The broadening lens includes a central optic.

29 Claims, 20 Drawing Sheets

(56) References Cited

U.S. PATENT DOCUMENTS

| | | | | |
|---|---|---|---|---|
| 2015/0300580 A1* | 10/2015 | Sharrah | ................ | F21V 7/0091 |
| | | | | 362/187 |
| 2016/0025305 A1* | 1/2016 | Maier | ................ | G02B 19/0028 |
| | | | | 362/202 |
| 2016/0047511 A1* | 2/2016 | Jones | ................ | G02B 19/0061 |
| | | | | 362/581 |
| 2016/0116139 A1* | 4/2016 | Zhao | ..................... | F21V 5/045 |
| | | | | 362/308 |

* cited by examiner

LIGHTING DEVICE WITH CENTRAL AND PERIPHERAL ILLUMINATION

CLAIM OF PRIORITY

This application claims priority to U.S. Provisional Patent Application No. 62/057,622, filed Sep. 30, 2014, the contents of which are hereby incorporated by reference.

FIELD OF THE INVENTION

The present invention relates generally to flashlights and, in particular, to a lighting device having central and peripheral illumination.

BACKGROUND

Lighting devices, such as flashlights and cap lamps in general are typically designed to have either a bright center spot for central illumination or a dispersed type flood light for peripheral illumination. Alternative prior art lighting device designs have the ability to be adjustable to obtain varying degrees of spot/flood light. In some cases a light may have multiple LED's with one main light facing forward to give the spot light and one facing down (90 degrees from the main light) to illuminate and act more like a flood light.

Slips, trips and falls account for a large portion of accidents and lost work time. A significant contributor to these types of accidents is the lack of good lighting. An individual's ability to recognize objects and maintain good spatial orientation is directly affected by the light that is available to the individual. Both good central and peripheral light are needed to have the best visual acuity and spatial orientation. When an individual does not have good object recognition (visual acuity) and/or good spatial orientation, the potential for a slip, trip or fall by the individual is significantly increased. One's sense of balance is significantly affected by light levels. In poor lighting levels, tripping on an object is more likely to result in a fall and injury. In good lighting, where there is good spatial orientation, an individual is more likely to recover from bumping into an object resulting in a stumble rather than a fall.

To obtain a higher level of safety, there is a need for a light that produces both a bright center spot light and a good peripheral light (flood light). A light that provides both a bright center spot and bright peripheral light results in a safer light. The ability for a light to maintain a bright center spot while simultaneously lighting the peripheral region of a user's sight to provide a wide field of view is therefore desirable.

DETAILED DESCRIPTION OF EMBODIMENTS

Figure 1:
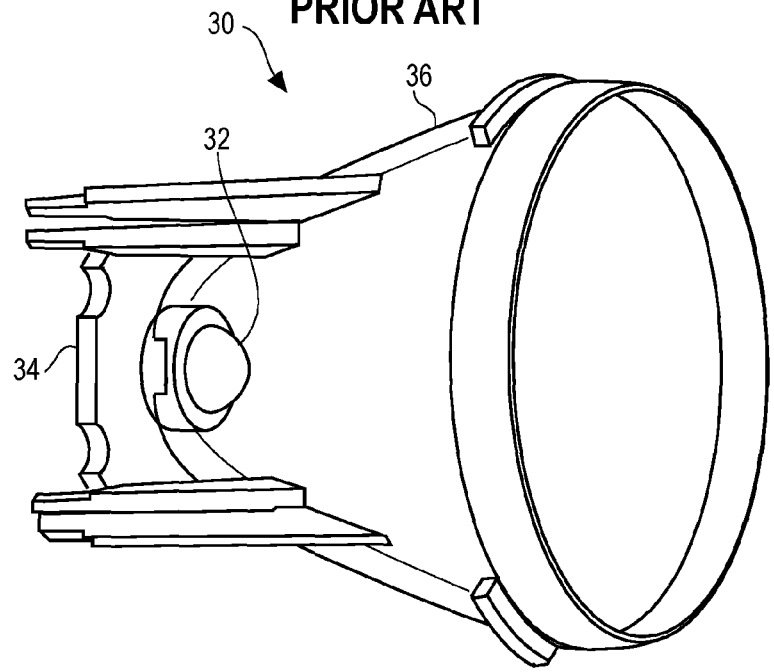
FIG. 1 is a perspective view of a prior art light assembly including a light emitting diode (LED) assembly connected to a reflector.
Figure 2:
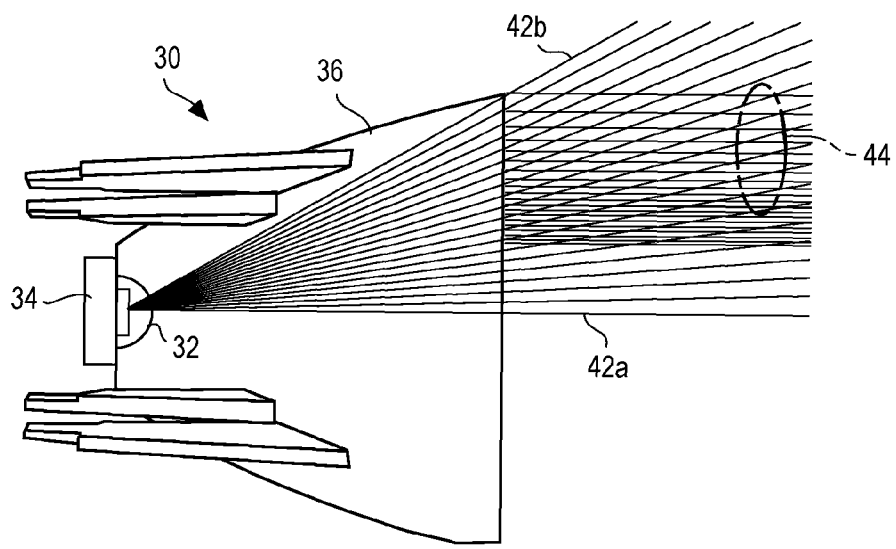
FIG. 2 is a side elevational view of the prior art light assembly of FIG. 1 illustrating the distribution paths taken by light produced by the LED assembly.

A prior art light assembly is indicated in general at 30 in FIGS. 1 and 2 and is of the type that is typically installed in flashlights and receives electrical power from battery cells or a battery power pack. As illustrated in FIGS. 1 and 2, a light emitting diode (LED) assembly including an LED 32 and an associated circuit board 34 is attached to a reflector 36 so that the LED 32 is positioned within a central opening of the reflector. While embodiments of the invention are described below in terms of an LED light source, alternative types of light sources known in the prior art could be used instead.

In operation, the light rays produced by the LED 32 follow the paths illustrated in FIG. 2. More specifically, direct light rays, such as indicated at 42*a* and 42*b*, emit out of the front of a flashlight within which the light assembly 30 is installed while reflected light rays, circled at 44 in FIG. 2, bounce off of, or are reflected by, reflector 36 prior to emission out of the front of the flashlight. The reflected light rays 44, which are directed to form a bright central or center spot light, typically contribute greater than 99% of the peak light intensity produced by the flashlight. The direct light rays exiting the light assembly at a diverging angle, such as 42*b* in FIG. 2, provide poor or virtually no light in the peripheral region of the front of the flashlight.

Figure 3:
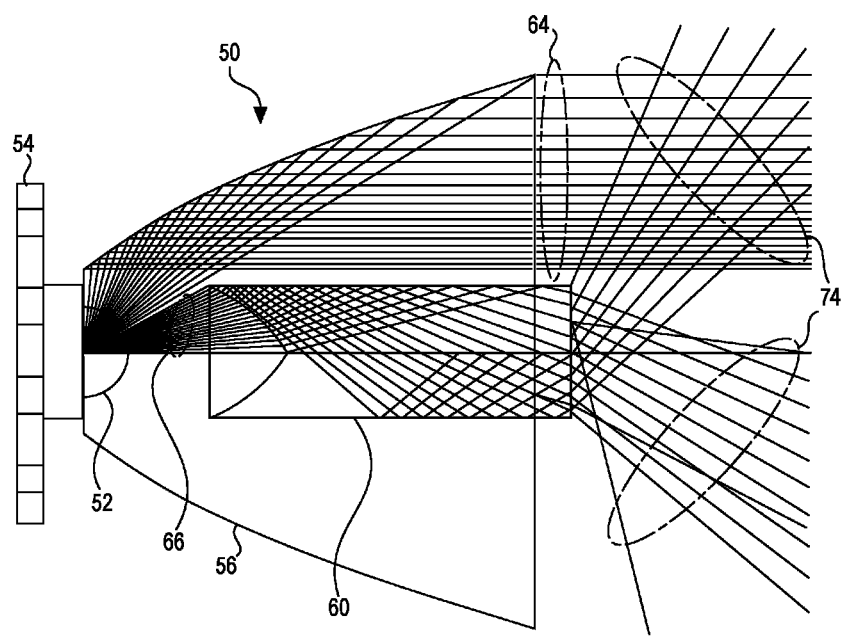
FIG. 3 is a side elevational view of a light assembly provided with a light tube having an axicon in accordance with a first embodiment of the present invention illustrating the distribution paths taken by light produced by the LED assembly.

A light assembly, indicated in general at 50 in FIG. 3, features a light emitting diode (LED) assembly including an LED 52 and an associated circuit board 54. The light assembly is attached to a reflector 56 so that the LED 52 is positioned within a central opening of the reflector and surrounded by the shiny or reflective internal surface of the reflector. In accordance with a first embodiment, a clear, solid, cylindrical light pipe 60 features an axicon (62 in FIGS. 4-7) and is positioned at the entrance of the light pipe (i.e. the end facing the LED 52). As will be explained below, the light pipe may be formed with, and/or held in place by, the lens of a flashlight within which the light assembly 50 is installed. As an example only, the light tube 60 may be constructed from solid high clarity polycarbonate, acrylic or another plastic.

As illustrated in FIG. 3, a portion of the light produced by the LED 52 (see 65 in FIG. 4) is reflected off of the reflector 56 to provide light rays 64 which enables the flashlight to provide a bright central spot or spot light. The remaining light rays 66 (FIGS. 3 and 4) enter the proximal end of the light pipe 60, and thus the axicon 62.

Figure 4:
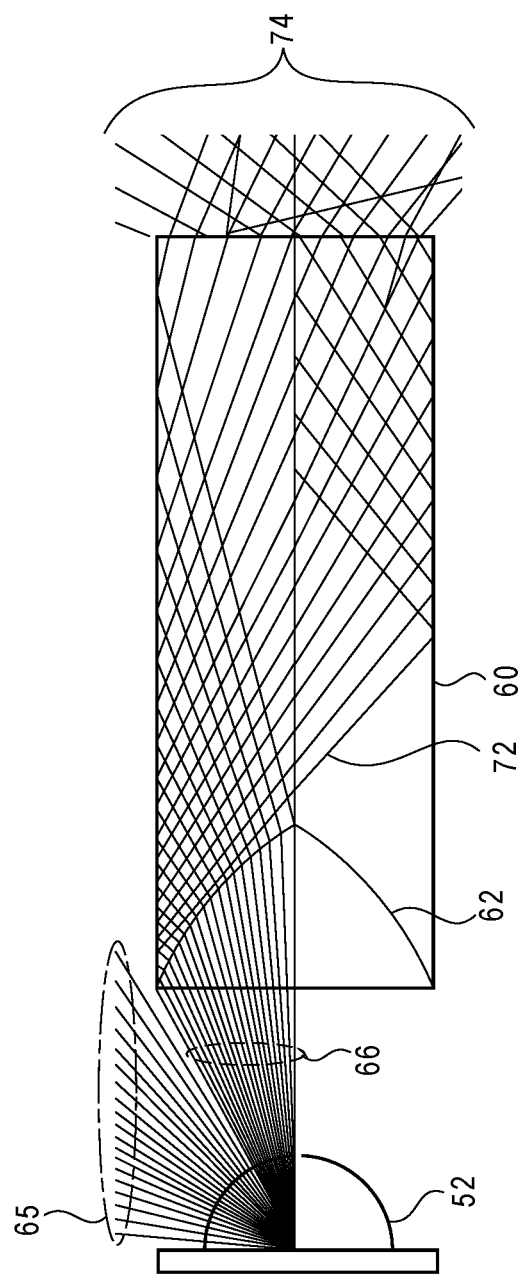
FIG. 4 is an enlarged view of the LED assembly and the light tube having an axicon of FIG. 4 illustrating the distribution paths taken by light produced by the LED assembly.

As illustrated at 72 in FIG. 4, the angular distribution of the light rays entering the light pipe is controlled by the shape of the axicon so that the light rays are reflected within the light pipe as they travel toward the light pipe distal end.

The shape of the axicon, the dimensions of the light pipe (i.e. length and diameter) and the distance of the light pipe proximal end from the LED is selected such that the light rays exiting the distal end of the light pipe are directed towards the peripheral area of the front of the flashlight as illustrated at 74 in FIGS. 3 and 4. These light rays 74 provide bright peripheral illumination for the flashlight.

Figure 5:
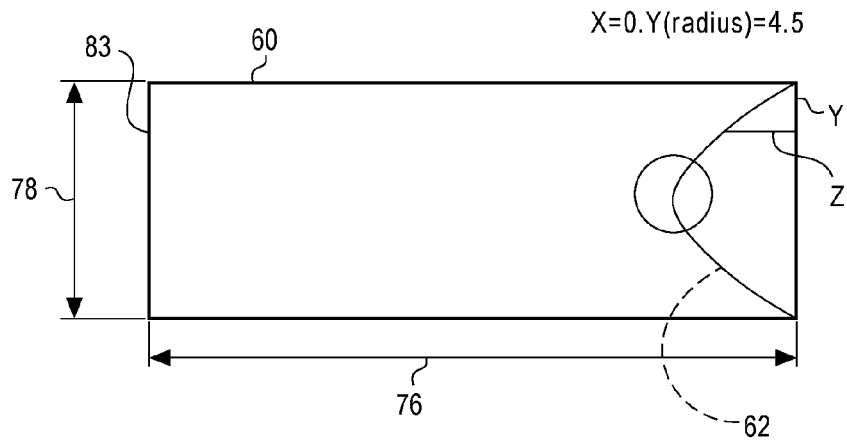
FIG. 5 is a side elevational view of the light tube having an axicon of FIGS. 3 and 4.
Figure 6:
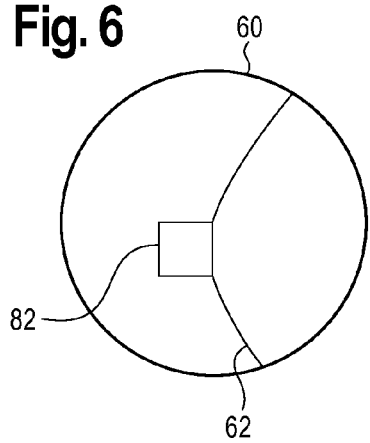
FIG. 6 is an enlarged view of the portion of the axicon indicated by circle A in FIG. 5.
Figure 7:
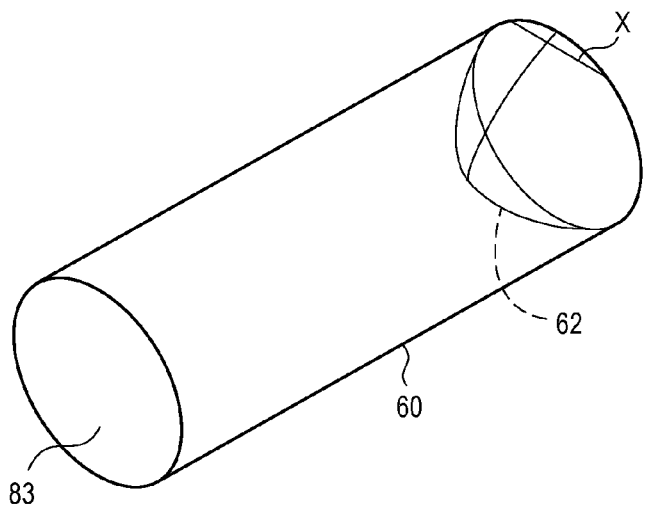
FIG. 7 is a perspective view of the light pipe with axicon of FIGS. 3-6.
Figure 8:
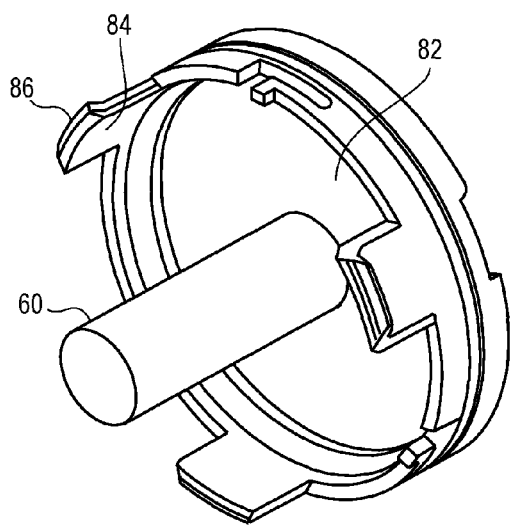
FIG. 8 is a perspective view of lens including the light pipe with axicon of FIGS. 3-7.
Figure 9:
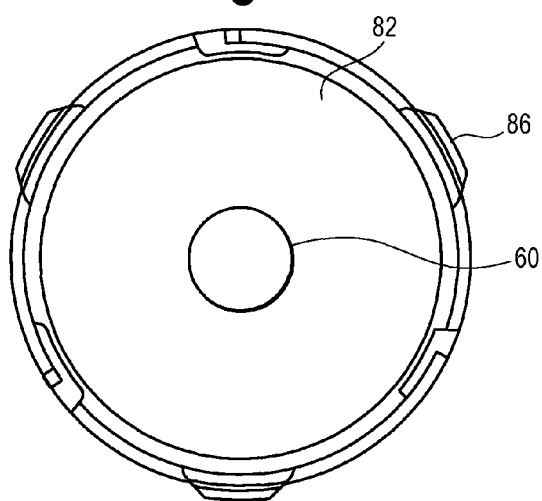
FIG. 9 is a front elevational view of the lens of FIG. 8.
Figure 10:
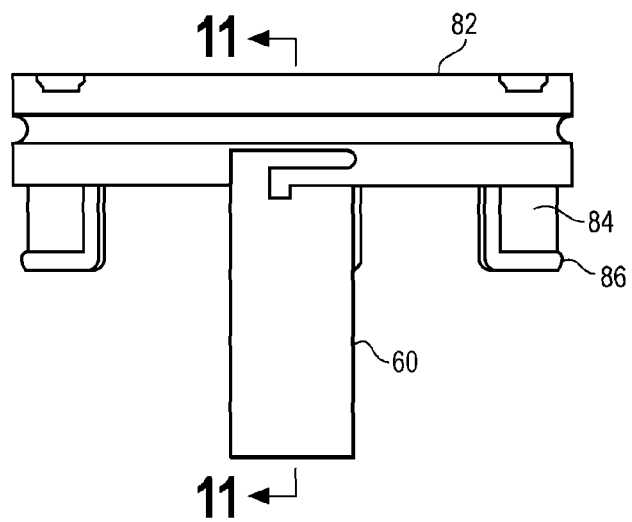
FIG. 10 is a side elevational view of the lens of FIGS. 8 and 9.
Figure 11:
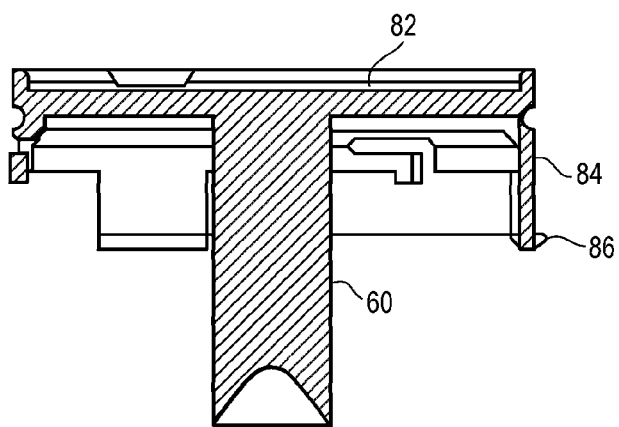
FIG. 11 is a cross sectional view of the lens of FIGS. 8-10 taken along line A-A of FIG. 10.

Examples of dimensions for the light pipe 60 and axicon 62 for an LED having an output normalized to 100 lumens are provided with reference to FIGS. 5-7. More specifically, the length of the light pipe 60, indicated by arrows 76 of FIG. 5, may be approximately 24.65 mm, while the diameter of the light pipe, indicated by arrows 78 in FIG. 5, may be approximately 9 mm. The circular flat central region of the axicon may have a diameter, indicated by arrows 82 in FIG. 6, of approximately 0.52 mm.

As an example only, the three-dimensional profile for the axicon 62, using a standard x, y, z coordinate system (see FIGS. 5 and 7), may be defined using the following equation and tables:

$$y = A + Bx + Cx^2 + Dx^3 + Ex^4 + Fx^5 + Gx^6$$

| | |
|---|---|
| A | 4.495 |
| B | −3.600E−01 |
| C | −3.565E−01 |
| D | 2.899E−01 |
| E | −1.367E−01 |
| F | 3.006E−02 |
| G | −2.525E−03 |

| Z | y (Radius) |
|---|---|
| 0.000 | 4.500 |
| 0.159 | 4.426 |
| 0.318 | 4.347 |
| 0.477 | 4.264 |
| 0.636 | 4.178 |
| 0.794 | 4.087 |
| 0.953 | 3.992 |
| 1.112 | 3.894 |
| 1.271 | 3.792 |
| 1.430 | 3.686 |
| 1.589 | 3.577 |
| 1.748 | 3.464 |
| 1.907 | 3.347 |
| 2.065 | 3.226 |
| 2.224 | 3.102 |
| 2.383 | 2.973 |
| 2.542 | 2.840 |
| 2.701 | 2.703 |
| 2.860 | 2.560 |
| 3.019 | 2.413 |
| 3.178 | 2.260 |
| 3.336 | 2.100 |
| 3.455 | 1.933 |
| 3.654 | 1.758 |
| 3.813 | 1.573 |
| 3.972 | 1.375 |
| 4.131 | 1.161 |
| 4.290 | 0.924 |
| 4.449 | 0.646 |
| 4.607 | 0.262 |
| 4.607 | 0.000 |

Of course alternative profiles and sizes may be used for the axicon 62.

As shown in FIGS. 8-11, the light pipe 62 may be integrally formed with a lens 82 so that the distal end of the light pipe, shown at 83 in FIGS. 5 and 7, is joined to the lens. For example, the lens and light pipe may be molded from clear plastic as a single part. In an alternative embodiment, the distal end 83 of the light pipe 60 could be joined by adhesive, or otherwise secured, to the lens 82.

Figure 12:
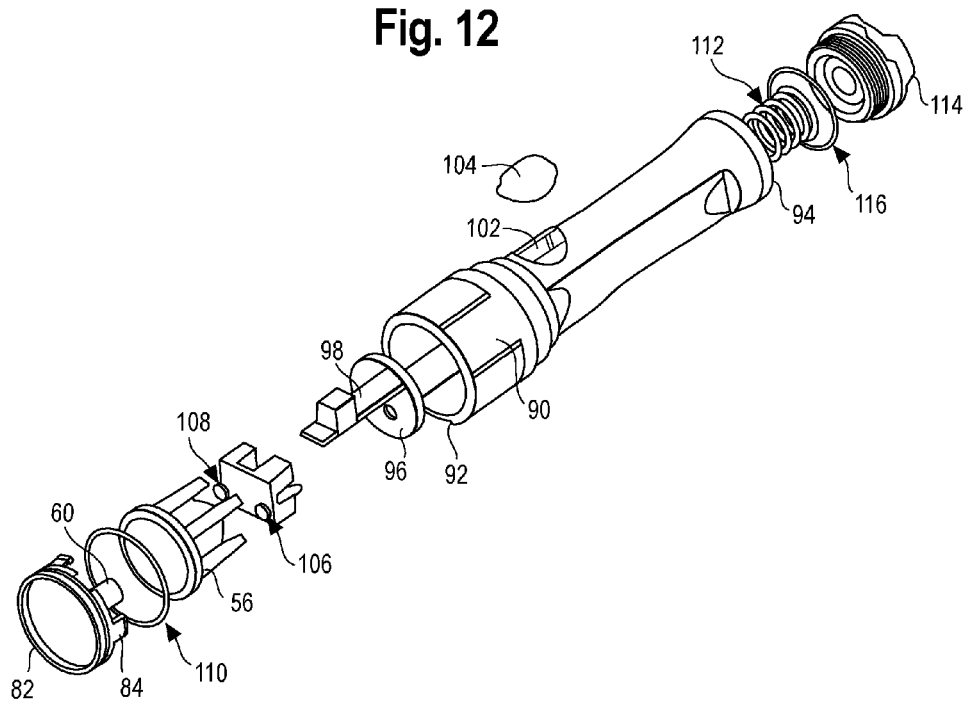
FIG. 12 is an exploded perspective view of a flashlight that incorporates the lens of FIGS. 8-11.

The lens 82 of FIGS. 8-11 also features legs 84 having tabs 86 so that it may be assembled within a flashlight as illustrated in FIG. 12. More specifically, with reference to FIG. 12, a flashlight has a tube-shaped body 90 having a head open end 92 and a tail open end 94. During manufacture, a switch housing 96 and switch assembly 98 are inserted into the body of the flashlight and aligned with a switch opening 102. A switch 104 is secured within the switch opening and engages the switch assembly so that the switch may be used to turn the flashlight on and off. An LED assembly 106 is also placed in the flashlight body adjacent and operatively connected to the switch assembly 98 and is held in place by screws 108. As described previously, the LED assembly includes an LED that is positioned within the central opening of a reflector 56. The reflector is also received within the body of the flashlight as is an O-ring 110. The lens 82, including light pipe 60 is then inserted into the open end 92 of the body and locked in place with the tabs and legs 84. Battery cells are inserted through the tail end opening 94 of the body and are held in place by a tail spring 112 and tail cap 114, where the tail cap is threaded to engage the tail end of the body. A tail O-ring 116 is provided between the tail cap and the tail end of the body 92.

In alternative embodiments of the invention, the light pipe may be mounted within the body 90 of the flashlight separate from and independently of the lens 82. For example, the light pipe could be mounted within the body by a mounting bracket, plate or disk, a formation molded into the body or any other mounting method available in the art.

Figure 22A:
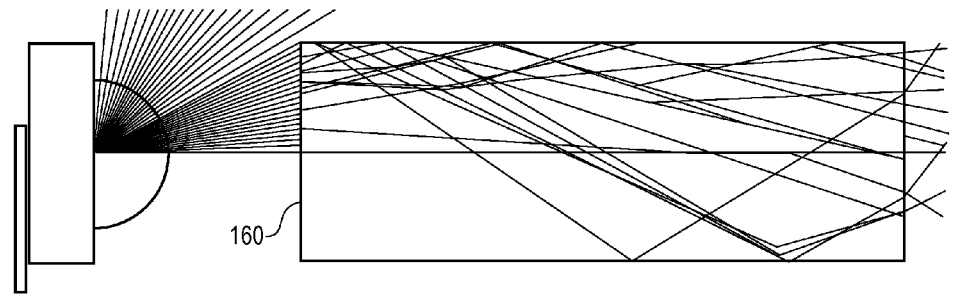
FIGS. 22a and 22b are side elevational views of a light assembly and a light assembly including a reflector provided with a light tube having a textured proximal surface.
Figure 22B:
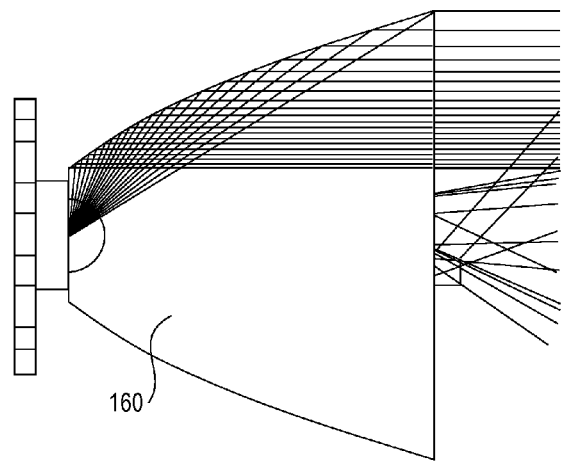
Figure 23:
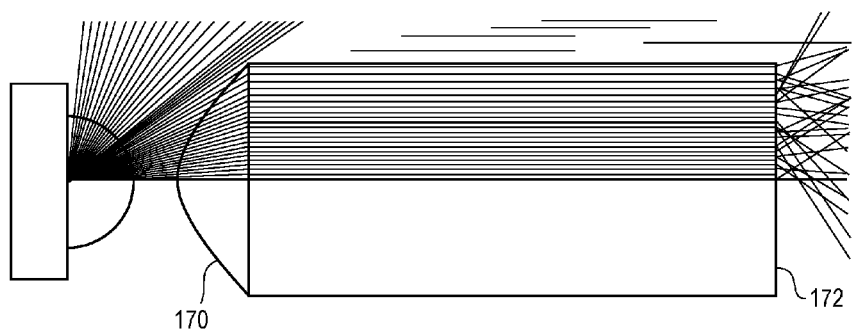
FIG. 23 is a side elevational view of a light assembly with a convex lens on the proximal surface and a textured surface on the distal end of the light tube.

Furthermore, alternative embodiments of the light pipe may include a textured proximal surface, as indicated at 160 in FIGS. 22a and 22b, instead of an axicon. In another alternative embodiment, the light pipe may be provided with a convex lens surface on the proximal end, illustrated at 170 in FIG. 23, with a textured diffuser surface 172 positioned on the distal end.

Figure 13:
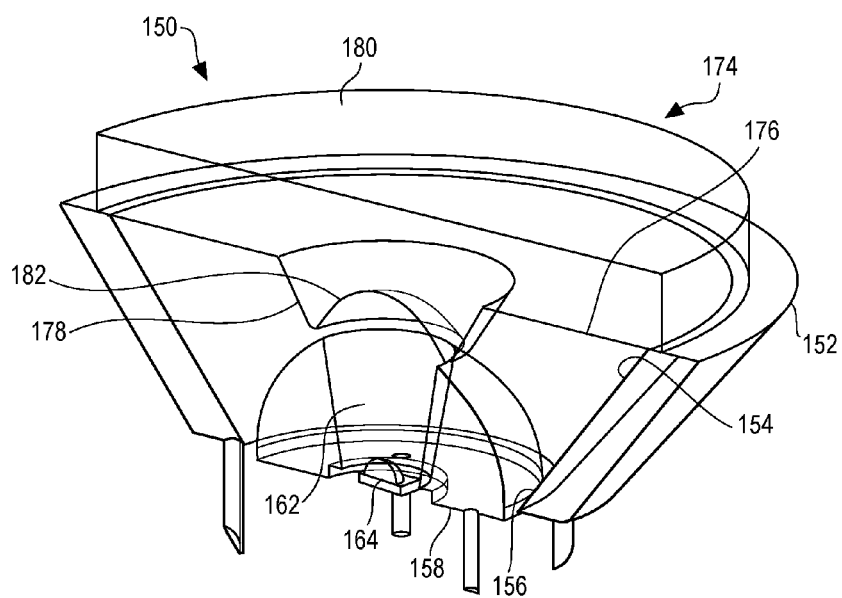
FIG. 13 is a sectional perspective view of a light assembly provided with a toroid optic, a mirror reflector, a broadening optic and a front window in accordance with a second embodiment of the present invention.
Figure 14:
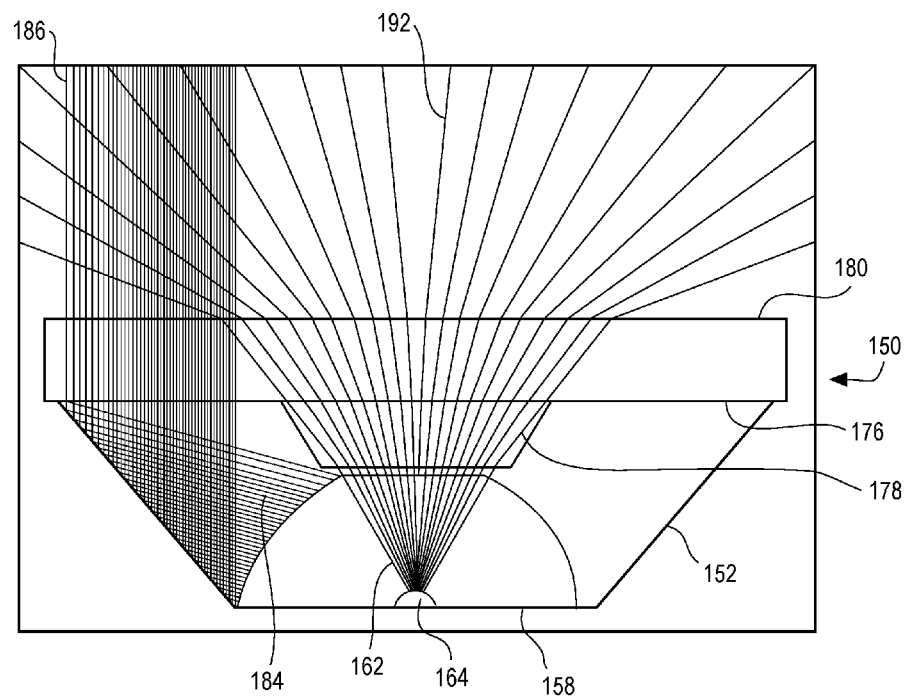
FIG. 14 is a side elevational view of the light assembly of FIG. 13 illustrating the distribution paths taken by light produced by the LED assembly.
Figure 15:
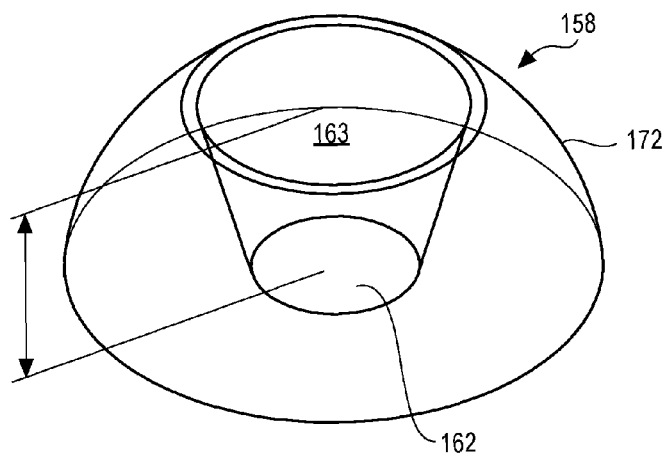
FIG. 15 is a perspective view of the toroid optic of the light assembly of FIGS. 13 and 14.
Figure 19:
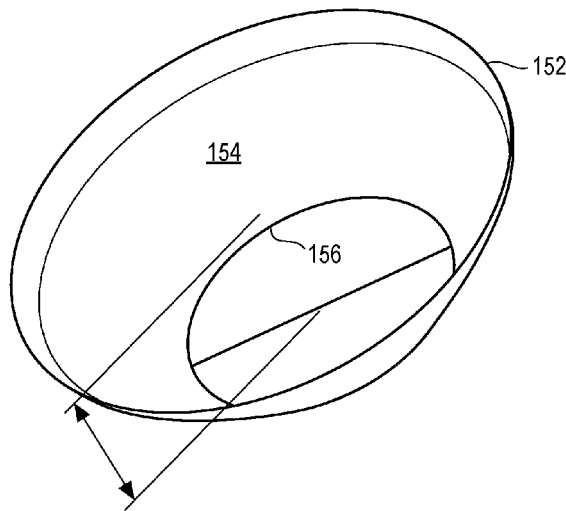
FIG. 19 is a perspective view of the mirror reflector of the light assembly of FIGS. 13 and 14.
Figure 20:
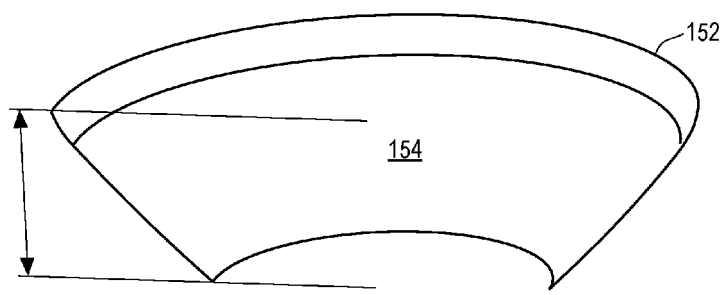
FIG. 20 is a cross sectional view of the mirror reflector of FIG. 19.

In an alternative embodiment a light assembly, indicated in general at 150 in FIGS. 13 and 14, includes a reflector 152 having an internal mirror surface 154, or other internal reflective surface, and an enlarged central opening 156 (also shown in FIGS. 19 and 20). Positioned within the central opening 156 of the reflector is a toroidal or doughnut-shaped toroid optic 158 formed of a material such as clear polycarbonate or acrylic. Alternative clear materials may be used.

Figure 16:
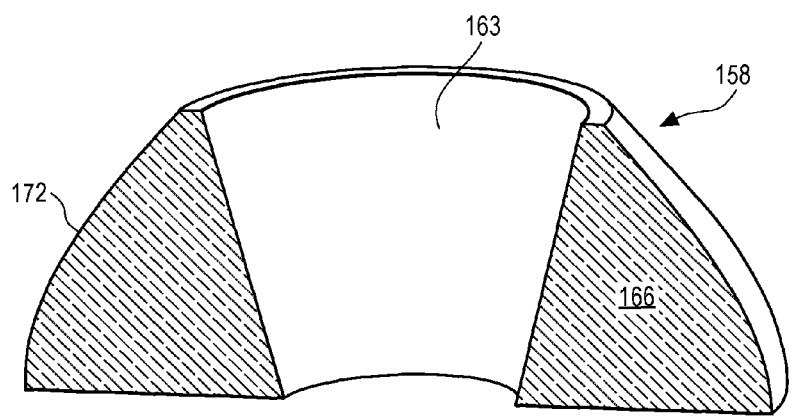
FIG. 16 is a cross sectional view of the toroid optic of FIG. 15.
Figure 17:
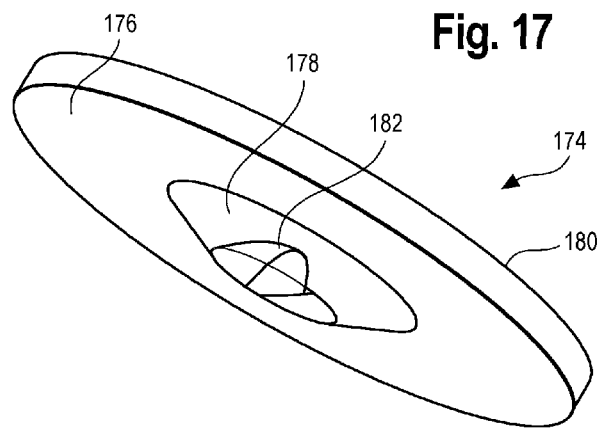
FIG. 17 is a perspective view of the broadening optic and front window of the light assembly of FIGS. 13 and 14.
Figure 18A:
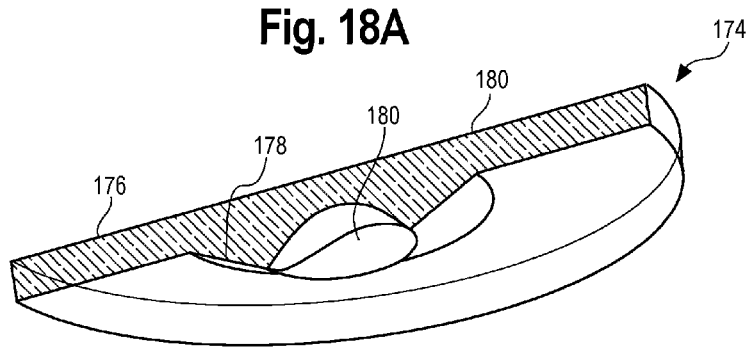
FIGS. 18A and 18B are cross sectional views of the broadening optic and front window of FIG. 17.
Figure 18B:
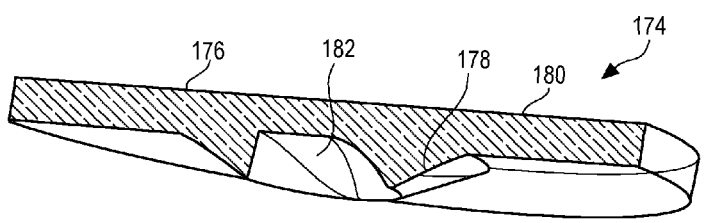

As shown in FIGS. 13-16, the toroid optic 158 includes a truncated cone-shaped central bore 162 with side walls 163 that taper outward from a proximal end towards a distal end. An LED 164 is positioned within the proximal end of the central bore 162. As best shown in FIG. 16, the toroid optic 158 features a generally triangular cross section 166 having a curved outer surface 172.

A broadening lens or cover 174 is positioned on the annular distal edge of the reflector and is preferably formed from clear polycarbonate or acrylic (but other materials may be used). The broadening lens has an annular flat window portion 176 surrounding a near beam center-fill lens 178 and a dome lens 182. The broadening lens also has a front window 180. The dome lens 182 is positioned in the middle of the near beam center-fill lens 178. The functionality of each of these components will be explained below. The components may be integrally formed of clear material, or may be formed separately and joined together.

In operation, with reference to FIG. 14, light rays produced by the LED 164 are directed by the toroid optic to provide both a center beam for central illumination and a wide angle light to provide a peripheral illumination. More specifically, light rays following the center beam optical path, after being emitted by the LED 164, are refracted by the toroid optic 158, as illustrated at 184 in FIG. 14. These light rays are then reflected by the mirrored interior surface (154 in FIGS. 13, 19 and 20) of the reflector 152 and transmitted through the flat window portion 176 and front window 180 of the broadening lens, as illustrated at 186 in FIG. 14.

Light rays that follow the wide angle light path, after being emitted from the LED 164, are partially collimated by the central bore of the toroid optic 158 so as to allow ~30% of the LED light to exit through the distal opening of the toroid optic to be used for broad-angle illumination. After the light rays exit the distal opening of the toroid optic, they are refracted by the dome lens (182 in FIGS. 13 and 17-18B) of the broadening lens and are transmitted through the front window 180 of the broadening lens, as illustrated at 192 in FIG. 14.

Figure 21:
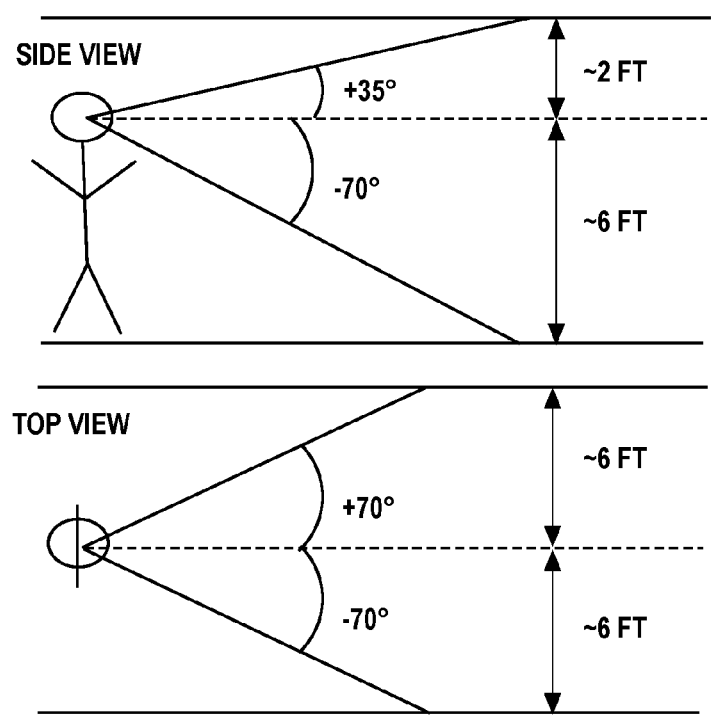
FIG. 21 is a schematic showing an example of the illumination area provided by a flashlight using the light assembly of FIGS. 13 and 14.
Figure 24:
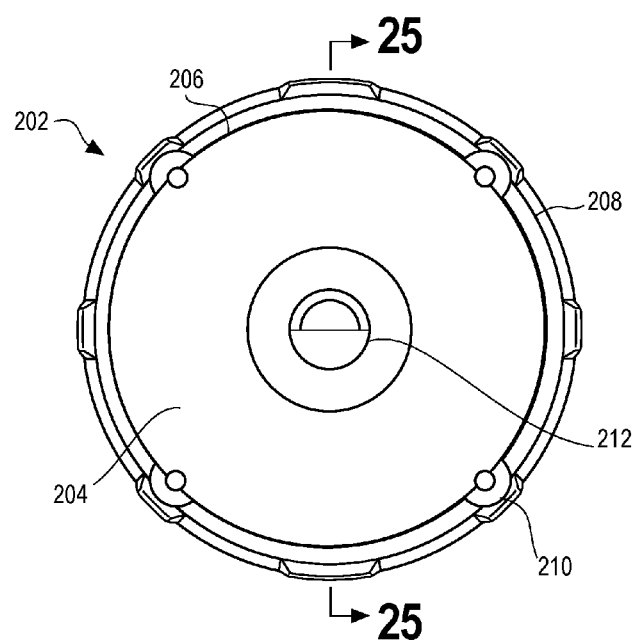
FIG. 24 is a front elevational view of a lens assembly in a cap lamp embodiment of the invention.

As a result of the light paths illustrated in FIG. 14 and described above, the angles of illumination coverage illustrated in FIG. 21 may be provided. It is to be understood that FIG. 21 shows a view angle that is the minimum for most applications. The view angle will vary by application A lens assembly in a cap lamp embodiment of the invention is indicated in general at 202 in FIGS. 24 and 25. The lens assembly includes a broadening lens 204, having a rim 206, which is positioned within a separate bezel 208. The bezel features a number of inwardly facing arcuate cutouts 210 which receive corresponding arc-shaped protrusions formed on the rim 206 of the lens. As a result, the lens does not rotate with respect to the bezel. The broadening lens features a central optic 212.

Figure 25:
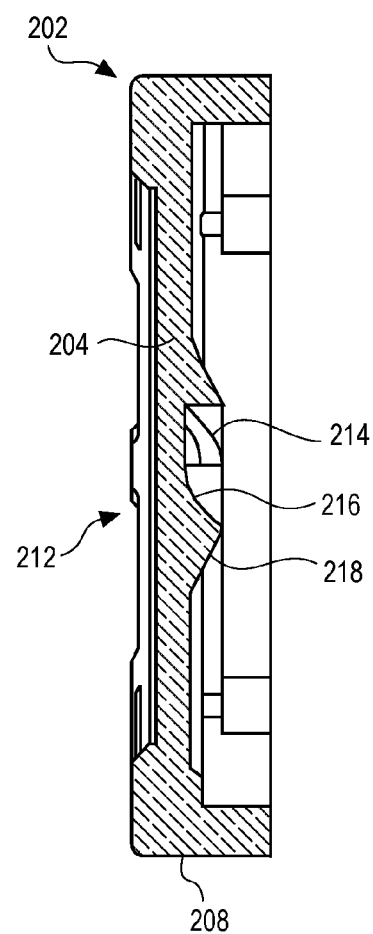
FIG. 25 is a cross sectional view of the lens assembly of FIG. 24 taken along lines 25-25.

As illustrated in FIG. 25, the central optic 212 of the lens features a cylindrical surface 214 and a parabolic surface 216 surrounded by an annular truncated conical surface 218. As an example only, the cylindrical surface 214 may be defined by the following equation:

$$z = \frac{cx^2}{1 + \sqrt{1 - (1+k)c^2x^2}}$$

Where x is a vertical axis perpendicular to, or coming out of, FIG. 25 and z is a horizontal axis running perpendicular to x. The point of origin is at the bottom or leftmost point of the parabolic surface 216. As an example only, c=−0.25 and k=−1.0.

The parabolic surface 216 may, for example, be defined by the following equation:

$$z = \frac{cr^2}{1 + \sqrt{1 - (1+k)c^2r^2}}$$

Where x is a vertical axis perpendicular to, or coming out of, FIG. 25 and z is a horizontal axis running perpendicular to x. The point of origin is at the bottom or leftmost point of the parabolic surface 216. As an example only, c=−0.25 and k=−1.0.

As an example only, the lens may be made of Bayer Makrolon 2405 or any other clear material.

Figure 26:
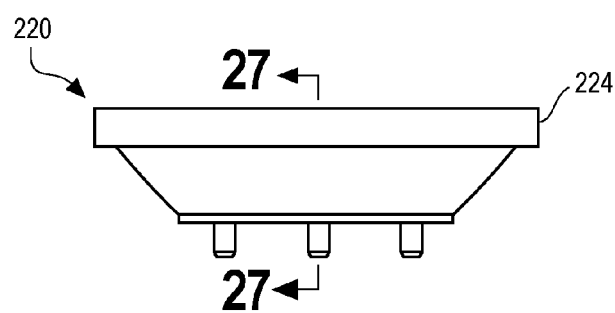
FIG. 26 is a side elevational view of a reflector in the cap lamp embodiment.
Figure 27:
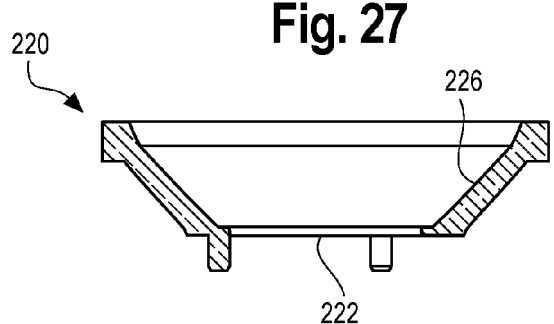
FIG. 27 is a cross sectional view of the reflector of FIG. 26 taken along line 27-27.

A reflector is indicated in general at 220 in FIGS. 26 and 27. The reflector has a truncated conical body with rim 224, an internal mirror surface 226, or other internal reflective surface, and an enlarged central opening 222 (also shown in FIG. 29).

Figure 28:
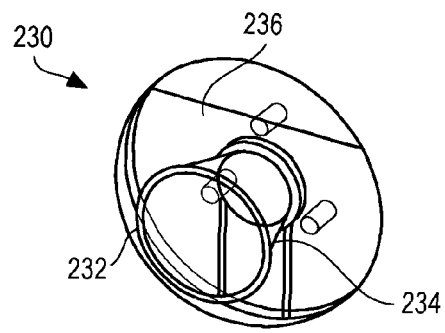
FIG. 28 is a perspective view of a toroid optic of the cap lamp embodiment with interior detail shown in phantom.

A toroidal or doughnut-shaped toroid optic is indicated in general at 230 in FIG. 28 and is preferably formed of a material such as clear polycarbonate or acrylic. Alternative clear materials may be used. The toroid optic includes a truncated cone-shaped central bore 232 with side walls 234 that taper outward from a proximal end towards a distal end. The toroid optic features a curved outer surface 236.

Figure 29:
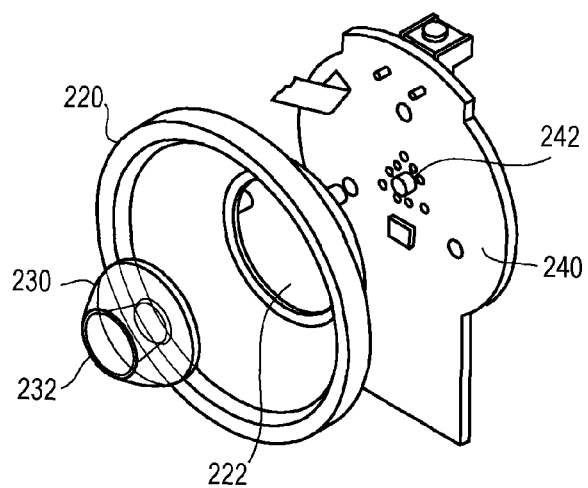
FIG. 29 is an exploded view of an assembly that includes the toroid optic of FIG. 28, the reflector of FIG. 27 and a circuit board to which a light source is mounted.

As illustrated in FIG. 29, the reflector 220 and toroidal optic 230 are assembled to a circuit board 240 upon which an LED light source 242 is mounted. As an example only, and as illustrated in FIG. 29, each of the toroid optic and the reflector have feet or posts that engage corresponding openings in the circuit board 240. When assembled, as illustrated at 220 in FIG. 30, the LED light source is positioned within the bore 232 of the toroid optic and the toroid optic is positioned within the central opening 222 of the reflector.

Figure 30:
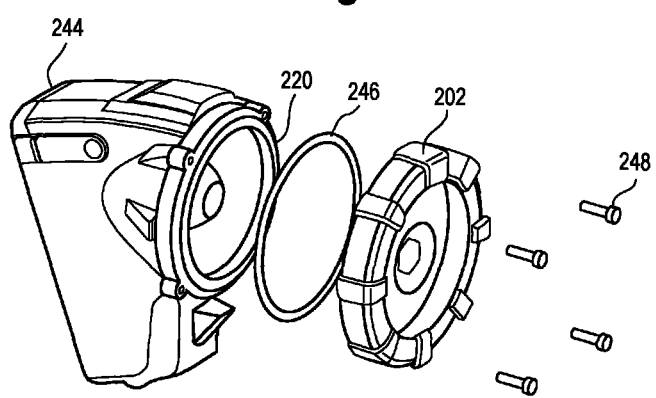
FIG. 30 is an exploded perspective view of the cap lamp embodiment of the invention.

With reference to FIG. 30, the assembled components of FIG. 29 are positioned within the housing of a cordless cap lamp 244. The housing contains the cap lamp battery, switch, circuit board (240 of FIG. 29) and other components known in the art for such devices. An O-ring gasket 246 is sandwiched between the rim of the reflector 220 and the bezel of the lens assembly 202, and the assembly is held together by rivets 248. Of course other fastening arrangements may be used.

In view of the above, the present invention provides optic systems to enhance peripheral light or illumination with little to no loss in central light or illumination.

While the preferred embodiments of the invention have been shown and described, it will be apparent to those skilled in the art that changes and modifications may be made therein without departing from the spirit of the invention, the scope of which is defined by the following claims.

What is claimed is:

1. A light assembly comprising:
   a. a light source;
   b. a reflector having a reflective interior surface and a central opening within which the light source is positioned;
   c. a light pipe having a proximal end and a distal end, said proximal end positioned adjacent to said light source;
   d. a lens mounted to the reflector, wherein the light pipe is integrally formed with the lens and is mounted between the lens and the light source;
   e. said light pipe adapted so that a first group of light rays produced by the light source are reflected within the light pipe and directed out of the distal end of the light pipe at angles to provide peripheral illumination; and
   f. wherein a second group of light rays produced by the light source reflect off of the reflective interior surface of the reflector to provide central illumination.

2. The light assembly of claim 1 wherein the light source in a light emitting diode.

3. The light assembly of claim 1 wherein the light pipe is formed from clear material.

4. The light assembly of claim 3 wherein the light pipe is formed from clear acrylic or clear polycarbonate.

5. The light assembly of claim 1 wherein the lens is attached to the reflector with distal end of the light pipe attached to the reflector.

6. The light assembly of claim 1 wherein the proximal end of the light pipe includes an axicon formed therein.

7. The light assembly of claim 1 wherein the proximal end of the light pipe is textured.

8. The light assembly of claim 1 wherein the proximal end of the light pipe is provided with a convex lens surface.

9. The light assembly of claim 8 wherein the distal end of the light pipe is textured.

10. The light assembly of claim 1 wherein the light source includes a circuit board and the proximal end of the light pipe is positioned adjacent to the circuit board.

11. A flashlight comprising:
    a. a tube-shaped body;
    b. a light assembly positioned within the body including:
       i) a light source;
       ii) a reflector having a reflective interior surface and a central opening within which the light source is positioned;
       iii) a light pipe having a proximal end and a distal end, said proximal end positioned adjacent to said light source;
       iv) a lens mounted to the reflector, wherein the light pipe is integrally formed with the lens and is mounted between the lens and the light source;
       v) said light pipe adapted so that a first group of light rays produced by the light source are reflected within the light pipe and directed out of the distal end of the light pipe at angles to provide peripheral illumination; and
       vi) wherein a second group of light rays produced by the light source reflect off of the reflective interior surface of the reflector to provide central illumination;
    c. a battery cell or pack positioned within the body;
    d. a switching assembly positioned within the body and connected to the battery cell and the light source, said switching assembly selectively permitting power from the battery cell or pack to flow to the light source.

12. The flashlight of claim 11 wherein the light source in a light emitting diode.

13. The flashlight of claim 11 wherein the light pipe is formed from clear material.

14. The flashlight of claim 13 wherein the light pipe is formed from clear acrylic or clear polycarbonate.

15. The light assembly of claim 11 wherein the lens is attached to the reflector with distal end of the light pipe attached to the reflector.

16. The flashlight of claim 11 wherein the lens is attached to the reflector and wherein said light pipe is mounted within the body independent of the lens.

17. The flashlight of claim 11 wherein the light pipe is mounted within the body by a mounting bracket, plate or disk or a formation molded into the body.

18. The light assembly of claim 11 wherein the proximal end of the light pipe includes an axicon formed therein.

19. The light assembly of claim 11 wherein the proximal end of the light pipe is textured.

20. The light assembly of claim 11 wherein the proximal end of the light pipe is provided with a convex lens surface.

21. The light assembly of claim 20 wherein the distal end of the light pipe is textured.

22. A light assembly comprising:
    a. a light source;
    b. a reflector having a reflective interior surface and a central opening;
    c. a toroidal-shaped toroid optic including a central bore, said light source positioned in the central bore and said toroid optic positioned within the central opening of the reflector;
    d. a broadening lens attached to the reflector and positioned adjacent to said toroid optic opposite said light source, said broadening lens including an annular flat window portion, a near beam center-fill lens, a dome lens and a front window;
    e. said light source producing a first group of light rays that are refracted by the toroid optic, reflected by the reflective interior surface of the reflector and transmitted through the flat window portion and front window of the broadening lens to provide central illumination;
    f. said light source producing a second group of light rays that are collimated by the central bore of the toroid optic, refracted by the dome lens of the broadening lens and transmitted through the front window of the broadening lens to provide peripheral illumination.

23. The light assembly of claim 22 wherein the light source is a light emitting diode.

24. The light assembly of claim 22 wherein the annular flat window portion, near beam center-fill lens, dome lens and front window of the broadening lens are formed as a single component.

25. The light assembly of claim 22 wherein the central bore of the toroid optic has a truncated cone shape and the toroid optic has a generally triangular cross section where an outer surface of the toroid optic is curved.

26. A flashlight comprising:
   a. a tube-shaped body;
   b. a light assembly positioned within the body including:
      i) a light source;
      ii) a reflector having a reflective interior surface and a central opening;
      iii) a toroidal-shaped toroid optic including a central bore, said light source positioned in the central bore and said toroid optic positioned within the central opening of the reflector;
      iv) a broadening lens attached to the reflector and positioned adjacent to said toroid optic opposite said light source, said broadening lens including an annular flat window portion, a near beam center-fill lens, a dome lens and a front window;
      v) said light source producing a first group of light rays that are refracted by the toroid optic, reflected by the reflective interior surface of the reflector and transmitted through the flat window portion and front window of the broadening lens to provide central illumination;
      vi) said light source producing a second group of light rays that are collimated by the central bore of the toroid optic, refracted by the dome lens of the broadening lens and transmitted through the front window of the broadening lens to provide peripheral illumination;
   c. a battery cell or pack positioned within the body;
   d. a switching assembly positioned within the body and connected to the battery cell and the light source, said switching assembly selectively permitting power from the battery cell or pack to flow to the light source.

27. The flashlight of claim 26 wherein the light source is a light emitting diode.

28. The flashlight of claim 26 wherein the annular flat window portion, near beam center-fill lens, dome lens and front window of the broadening lens are formed as a single component.

29. The flashlight of claim 26 wherein the central bore of the toroid optic has a truncated cone shape and the toroid optic has a generally triangular cross section where an outer surface of the toroid optic is curved.

* * * * *